(12) United States Patent
Wager et al.

(10) Patent No.: US 10,552,904 B2
(45) Date of Patent: Feb. 4, 2020

(54) DEVICE, SYSTEM, AND METHOD FOR TRANSFER OF COMMODITIES

(71) Applicant: Castor Pollux Holdings SARL, New York, NY (US)

(72) Inventors: Steve Wager, New York, NY (US); Charles Cascarilla, New York, NY (US); Vineeth Bhuvanagiri, New York, NY (US); Alex Lam, New York, NY (US)

(73) Assignee: Castor Pollux Holdings SARL, New York, NY (US)

( * ) Notice: Subject to any disclaimer, the term of this patent is extended or adjusted under 35 U.S.C. 154(b) by 749 days.

(21) Appl. No.: 15/217,030

(22) Filed: Jul. 22, 2016

(65) Prior Publication Data

US 2017/0024817 A1 Jan. 26, 2017

Related U.S. Application Data

(60) Provisional application No. 62/196,743, filed on Jul. 24, 2015, provisional application No. 62/287,772, filed on Jan. 27, 2016.

(51) Int. Cl.
*G06Q 40/04* (2012.01)
*H04L 9/32* (2006.01)

(52) U.S. Cl.
CPC .......... *G06Q 40/04* (2013.01); *H04L 9/3234* (2013.01); *G06Q 2220/00* (2013.01); *H04L 2209/56* (2013.01)

(58) Field of Classification Search
CPC ........ G06Q 10/00; G06Q 20/00; G06Q 30/00; G06Q 40/00
(Continued)

(56) References Cited

U.S. PATENT DOCUMENTS 7,130,825 B2 * 10/2006 Vlahoplus ............. G06Q 30/06
705/37
7,856,395 B2 * 12/2010 Jackson ............. G06Q 20/042
705/35
(Continued)

OTHER PUBLICATIONS

Chiu, "A new era in fintech payment innovations ? A perspective from the institutions and regulation of payment systems", Law, Innovation and Technology, 2017, vol. 9, No. 2, 190-234, https://doi.org/10.1080/17579961.2017.1377912. (Year: 2017).*
(Continued)

*Primary Examiner* — Frantzy Poinvil (57) ABSTRACT

A device, system, and method transfer commodities using tokens. The method performed by a first entity includes receiving from a second entity a request for tokens, the request indicating an unallocated position of a commodity of the second entity, the unallocated position managed by a third entity. The method includes transmitting to the third entity a further request for a transfer of the unallocated position of the second entity to the first entity. The method includes receiving from the third entity an indication of the transfer of the unallocated position from the second entity to the first entity. The method includes generating the tokens for the second entity that correspond to the unallocated position of the second entity of the request. The method includes generating and transmitting data including first data corresponding to the generation of the tokens and second data corresponding to an ownership of the tokens.

20 Claims, 4 Drawing Sheets

(58) Field of Classification Search
USPC .................................................. 705/3–44, 64
See application file for complete search history.

(56) References Cited

U.S. PATENT DOCUMENTS

| | | | |
|---|---|---|---|
| 9,849,364 B2* | 12/2017 | Tran ........................ | H04L 67/12 |
| 2002/0029183 A1* | 3/2002 | Vlahoplus .............. | G06Q 30/06 |
| | | | 705/37 |
| 2003/0014372 A1 | 1/2003 | Wheeler et al. | |
| 2006/0206423 A1 | 9/2006 | Stenard et al. | |
| 2007/0106594 A1 | 5/2007 | Vlahoplus et al. | |
| 2007/0226122 A1 | 9/2007 | Burrell et al. | |
| 2009/0012904 A1* | 1/2009 | McCord ............. | G06Q 30/0601 |
| | | | 705/80 |
| 2009/0198626 A1* | 8/2009 | Neshitov ................ | G06Q 30/00 |
| | | | 705/80 |
| 2009/0271328 A1 | 10/2009 | Bloom | |
| 2013/0091059 A1 | 4/2013 | Stals et al. | |
| 2013/0339212 A1 | 12/2013 | Frankel | |
| 2014/0052602 A1* | 2/2014 | Spirgel ................... | G06Q 40/00 |
| | | | 705/37 |
| 2014/0089157 A1* | 3/2014 | Hardison, III ......... | G06Q 40/04 |
| | | | 705/37 |
| 2014/0279355 A1 | 9/2014 | Merk | |
| 2015/0262176 A1* | 9/2015 | Langschaedel ...... | G06Q 20/065 |
| | | | 705/71 |
| 2016/0012465 A1* | 1/2016 | Sharp ..................... | G06Q 20/18 |
| | | | 705/14.17 |
| 2016/0098730 A1* | 4/2016 | Feeney ............. | G06Q 30/0185 |
| | | | 705/71 |
| 2016/0110808 A1 | 4/2016 | Yu | |

OTHER PUBLICATIONS

Andreas M. Antonopoulos, "Mastering Bitcoin—Unlocking Digital Cryptocurrencies", O'Reilly Media, Beijing Cambridge Farnham Koln Sebastopol Tokyo, XP055306939, ISBN: 978-1-4493-7404-4, p. 161-p. 215, Dec. 20, 2014.

* cited by examiner

DEVICE, SYSTEM, AND METHOD FOR TRANSFER OF COMMODITIES

PRIORITY CLAIM/INCORPORATION BY REFERENCE

This application claims priority to U.S. Provisional Application Ser. No. 62/196,743 entitled "Bankchain Obligation Tokens" filed on Jul. 24, 2015 and U.S. Provisional Application 62/287,772 entitled "Apparatus, Systems, and Methods for Transfer of Commodities" filed on Jan. 27, 2016. The entire disclosures of these applications are incorporated herein by reference.

BACKGROUND INFORMATION

A financial institution or other institution may own a commodity that is transferable for funds (e.g., a cash amount). For example, the commodity may be a metal (e.g., gold, silver, copper, platinum, palladium, etc.), a natural resource (e.g., oil, natural gas, diesel, ethanol, uranium, wheat, corn, sugar, soybean, coffee, coco, rice, oats, mils, lumber, etc.), a financial asset (e.g., a security, a treasury bond, a stock, etc.), etc. The institution that owns the commodity may be a seller in a transaction with a buyer who purchases the commodity. The exchange of the commodity for the funds may often take a significant amount of time, particularly when the commodity is a precious metal. Specifically, the buyer may satisfy the responsibility of transmitting the funds but only upon delivery of the commodity. As the commodity is required to be physically transferred into the possession of the buyer, this transaction may entail a significant amount time, often several days.

The funds may be provided in a variety of ways. For example, cash may be physically delivered from the buyer to the seller. In another example, an electronic payment may be transferred from a buyer's account to a seller's account. Although the transfer of the funds may be accomplished in a more efficient and faster manner, the time in which the transaction is completed is still limited to the time required for the commodity to be transferred.

SUMMARY OF THE INVENTION

The exemplary embodiments are directed to a method comprising: (A) receiving, by a computer of a first entity, from a computer of a second entity a request for tokens, the request indicating a predetermined amount of an unallocated position of a commodity of the second entity, the unallocated position being managed by a computer of a third entity; (B) transmitting, by the first entity computer, to the third entity computer a further request for a transfer of the unallocated position of the second entity to the first entity; (C) receiving, by the first entity computer, from the third entity computer an indication of the transfer of the unallocated position from the second entity to the first entity; (D) generating, by the first entity computer, the tokens to be assigned to the second entity, the tokens corresponding to the predetermined amount of the unallocated position of the second entity indicated in the request; (E) generating, by the first entity computer, data which includes first data corresponding to the generation of the tokens and second data corresponding to an ownership of the tokens; and (F) transmitting, by the first entity computer, the data to the second entity computer.

In an embodiment, the step (E) further comprises: (i) encrypting, by the first entity computer, the data; and (ii) transmitting, by the first entity computer, the encrypted data to predetermined recipients.

In an embodiment, wherein the predetermined recipients comprise the second and third entities.

In an embodiment, the indication is further indicative of a physical transfer of the commodity from the third entity to the first entity.

In an embodiment, the physical transfer of the commodity corresponds to a first value and the predetermined amount of the unallocated position of the second entity corresponds to a second value, the first value being greater than the second value.

In an embodiment, the method further comprises: generating, by the first entity computer, further tokens to be assigned to the third entity, the further tokens corresponding to a difference between the first value and the second value; and generating, by the first entity computer, further data which includes third data corresponding to the generation of the further tokens and fourth data corresponding to a further ownership of the further tokens.

In an embodiment, the step (E) further comprises: (i) encrypting, by the first entity computer, the data and the further data; and (ii) transmitting, by the first entity computer, the encrypted data and the encrypted further data to predetermined recipients.

In an embodiment, the first entity is a chartered trust company, wherein the second entity is a commodity dealer, and wherein the third entity is a clearing member.

In an embodiment, the further request instructs the third entity to allocate the commodity from the third entity to the first entity, the unallocated position of the second entity corresponding at least partially to the allocated commodity.

In an embodiment, the commodity is gold.

The exemplary embodiments are directed to a device comprising: a non-transitory memory having a program stored thereon; and a processor executing the program, wherein the execution of the program causes the processor to perform operations comprising: (A) receiving from a computer of a second entity a request for tokens, the request indicating a predetermined amount of an unallocated position of a commodity of the second entity, the unallocated position being managed by a computer of a third entity; (B) transmitting to the third entity computer a further request for a transfer of the unallocated position of the second entity to the first entity; (C) receiving from the third entity computer an indication of the transfer of the unallocated position from the second entity to the first entity; (D) generating the tokens to be assigned to the second entity, the tokens corresponding to the predetermined amount of the unallocated position of the second entity indicated in the request; (E) generating data which includes first data corresponding to the generation of the tokens and second data corresponding to an ownership of the tokens; and (F) transmitting, by the first entity computer, the data to the second entity computer.

The exemplary embodiments are directed to a method comprising: (A) receiving, by a computer of a first entity, a first request from a computer of a second entity to transfer tokens from the second entity to a third entity, the tokens including data representing an ownership position of a commodity by the second entity, at least a portion of the commodity being in a physical possession of the first entity; (B) receiving, by the first entity computer, a second request from a computer of the third entity to transfer the tokens from the second entity to the third entity; (C) when the first request matches the second request, verifying, by the first entity computer, the ownership position of the tokens by the second entity; and (D) upon the successful verification of the ownership position of the tokens, updating, by the first entity computer, the ownership position of the tokens from the second entity to the third entity.

In an embodiment, the step (D) comprises the following substeps: (I) temporarily preventing, by the first entity computer, an update to the ownership position of the tokens; and (II) transmitting, by the first entity computer, instructions to transfer funds from the third entity to the second entity.

In an embodiment, the method further comprises: (III) upon receiving from the second entity computer a confirmation indicating that the funds from the third entity have been received, performing the following substeps: (a) removing, by the first entity computer, the temporary prevention of the ownership position update of the tokens; (b) updating, by the first entity computer, the ownership data of the tokens to the third entity; and (c) transmitting, by the first entity computer, the updated ownership data to predetermined recipients, the predetermined recipients including the second and third entities.

In an embodiment, the step (b) further comprises: (i) encrypting, by the first entity computer, the updated ownership data; and (ii) transmitting, by the first entity computer, the encrypted data to the predetermined recipients.

In an embodiment, the predetermined recipients comprise at least one further entity uninvolved in the transfer of the tokens.

In an embodiment, the successful verification of the ownership position of the tokens is performed using a consensus operation.

In an embodiment, the method further comprises: upon a failed verification of the ownership position of the tokens, removing, by the first entity computer, the first and second requests to an exception pool.

In an embodiment, the method further comprises: receiving, by the first entity computer, satisfaction data from the second entity computer to convert the failed verification to the successful verification within a predetermined window; and continuing, by the first entity computer, to step (D).

The exemplary embodiments are directed to a device comprising: a non-transitory memory having a program stored thereon; and a processor executing the program, wherein the execution of the program causes the processor to perform operations comprising: (A) receiving, by a computer of a first entity, a first request from a computer of a second entity to transfer tokens from the second entity to a third entity, the tokens including data representing an ownership position of a commodity by the second entity, at least a portion of the commodity being in a physical possession of the first entity; (B) receiving, by the first entity computer, a second request from a computer of the third entity to transfer the tokens from the second entity to the third entity; (C) when the first request matches the second request, verifying, by the first entity computer, the ownership position of the tokens by the second entity; and (D) upon the successful verification of the ownership position of the tokens, updating, by the first entity computer, the ownership position of the tokens from the second entity to the third entity.

DETAILED DESCRIPTION

The exemplary embodiments may be further understood with reference to the following description and the related appended drawings, wherein like elements are provided with the same reference numerals. The exemplary embodiments are related to a device, a system, and a method for transferring commodities in a system where a digitized representation of commodities (hereinafter "tokens") are utilized instead of actual commodities and/or cash obligations. Specifically, the exemplary embodiments relate to a service entity that provides a service for performing different types of transactions related to the tokens that represent the commodity. An entity that owns a commodity may perform a first type of transaction where the commodity is represented with tokens that are generated. The entity may also perform a further type of transaction where the tokens are exchanged from the entity (e.g., a seller or a first party to the transaction) for a negotiated value or agreed upon amount of funds (e.g., cash) from a further entity (e.g., a buyer or a second party to the transaction).

An entity (e.g., a financial institution or other type of institution) may own a commodity that is transferable for funds (e.g., a cash amount). For example, the commodity may be a metal (e.g., gold, silver, copper, platinum, palladium, etc.), a natural resource (e.g., oil, natural gas, diesel, ethanol, uranium, wheat, corn, sugar, soybean, coffee, coco, rice, oats, mils, lumber, etc.), a financial asset (e.g., a security, a treasury bond, a stock, etc.). With the tokens representing the commodity, the service of the service entity provides accelerated and straight-through processed post-trade solutions. Also, with the token representing the commodity and an exchange of the token entailing conveying an interest in the underlying commodity (e.g., an ownership of the commodity), the token may track counterparty exposure at the gross and/or net obligation level.

Each token may include uniquely identifiable metadata. For example, there may be mutable metadata and immutable metadata. In a particular example where the commodity is a security, the mutable metadata of a corresponding token may include the current owner, the beneficial owner, time information when the token was last traded, and an active smart contract associated with the token. The immutable metadata may include the security issuer, the International Securities Identification Number (ISIN), the par amount, the listing location, the settlement location, and the issue date. In another example relating to gold, the token may relate to one or more specific physical commodities that are stored in a remote location. The token may represent an ownership to a specific bar of gold by including identification information (e.g., vault number, palette number, row number, column number, depth number, etc.). In this manner, various types of data may be tracked using the token (and in the distributed ledger).

The service provided by the service entity according to the exemplary embodiments may utilize a distributed ledger system. The distributed ledger system may also be decentralized and accessible only to participating entities that receive a distributed ledger. The distributed ledger used in the exemplary embodiments may utilize the principles of blockchain technology that creates a closed, trusted platform where the participating entities may transact with greater efficiency and transparency. The distributed ledger may be a database managed by the service entity but processed via "distributed" processors, namely the processors of computing units associated with the participating entities. For each transaction and/or instance in which a token is exchanged (i.e., an ownership has changed), the distributed ledger may include a block that is included to represent the token exchange. More specifically, the block may be a discrete time-stamped "container" of transactions that have happened across a given timeframe to track how a token ownership has changed. When appended to the distributed ledger, an aggregation block may be a block that is to be added to the blockchain containing aggregated transactions of a specific type for a specific settlement window. Therefore, the system may track every transaction utilizing every token (e.g., from each token being created to each token being redeemed). As noted above, the distributed ledger is managed by the service entity and a governance committee which is made up of the participating entities. However, the distributed ledger is distributed to the participating entities which provide processing operations related to utilizing the distributed ledger. In this manner, the system has a decentralized aspect.

The system utilized by the exemplary embodiments may also utilize the security measures involved with the blockchain technology (e.g., cryptography and consensus). The cryptography may provide anonymity and security for participating entities that are parties involved in a transaction from the perspective of participating entities who are non-parties to this particular transaction. With the distributed ledger being provided to all participating entities, the cryptography may be used for each block and transaction added to a chain along with details associated therewith, particularly new ownership or updated ownership of tokens. The consensus may provide a further security feature to ensure that a transaction is a valid transaction. The valid transaction is one in which the parties of the transaction are performing valid actions. For example, an issue arising from electronic currency is double spending in which the same currency may potentially be used for two separate transactions. This constitutes an invalid action. Accordingly, the exemplary embodiments may utilize a consensus operation in which a group decision by the participating entities is used to validate or reject a transaction. Specifically, the group decision may utilize a majority model or a supermajority model to further increase the security of validating the transaction.

In describing the mechanism by which the tokens are utilized herein, the commodity may be gold. However, it should be noted that the use of the gold is only exemplary. Those skilled in the art will understand that the commodity may also be any other type including other metals, natural resources, a security, etc. The exemplary embodiments may be modified for use with any of these other types of commodities.

A token representing an obligation to pay cash may be a collateral backed obligation token. A collateral backed obligation token has collateral attached thereto. Therefore, the token of the system may provide an additional level of security for participants. Specifically, the collateral backed obligation token may be backed by segregated collateral within a depository account, cash collateral encumbered with a third party or via a letter of credit (LoC). The collateral values may be reported to the Credit Control Interface (CCI). Participating entities may be issued an equivalent amount of collateral backed tokens for settlement purposes. In the case of a default, participating entities holding these types of tokens may receive a preferred interest in the underlying collateral.

In resolving transactions being processed via the service entity, it may be assumed that the service entity has performed all required actions prior to executing the functionalities described herein and received any required necessities that satisfy the restrictions associated with gold exchange (e.g., clearing the transactions with the appropriate authorities). Accordingly, all transactions that are performed via the exemplary embodiments may be authorized (e.g., processing with the NSS). Furthermore, with the participating entities of the system each receiving the distributed ledger, the participating entities may maintain intra-day credit facilities by counterpart within the Credit Communications Interface (CCI) to allow for simplified compliance monitoring and reporting.

Using the above operations, the exemplary embodiments provide a mechanism in which tokens provide a basis for an exchange of commodities. Accordingly, the exemplary embodiments are described with regard to two processes. In a first process of the exemplary embodiments, the tokens are created or generated for a participating entity who owns the commodity. In a second process of the exemplary embodiments, the tokens are exchanged for funds in a transaction between at least two participating entities.

Figure 1:
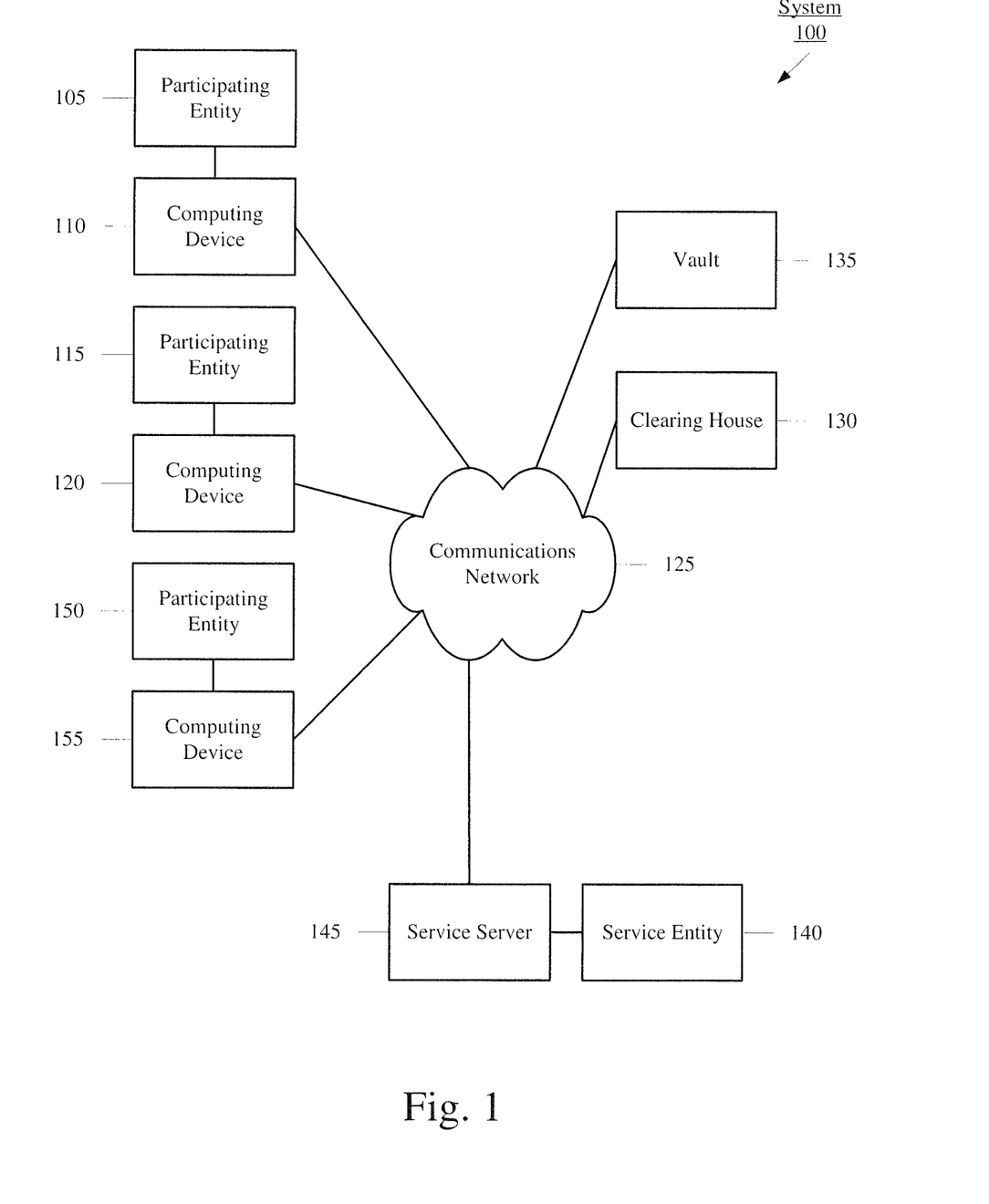
FIG. 1 shows a system for performing a transaction according to the exemplary embodiments.

FIG. 1 shows a system 100 for performing a transaction according to the exemplary embodiments. The system 100 may include a plurality of components associated with performing the commodity related transactions. As illustrated, the system 100 may include participating entities 105, 115, 150 utilizing computing devices 110, 120, 155, respectively. The system 100 may also include a communications network 125, a clearing house 130, a vault 135, and a service entity 140 providing a service via a service server 145. The system 100 illustrates connections between the components such that the first and second processes of the exemplary embodiments may be performed.

The participating entities 105, 115, 150 may represent any participating entity of the distributed ledger system service provided by the service entity 140. The participating entities 105, 115, 150 may be any type of financial institution. For example, the participating entities 105, 115, 125, 135, 165 may be larger institutional firms with significant amounts of investments (e.g., banks, management companies overseeing mutual funds, hedge funds, pension funds, etc., insurance companies, etc.). However, it should be noted that the participating entities 105, 115, 150 being larger institutional firms is only exemplary. The exemplary embodiments may also be utilized by any participating entity including smaller institutional firms, non-financial institutions, individuals, etc. Accordingly, the participating entities 105, 115, 150 may be any commodity dealer.

To utilize the distributed ledger system service, the computing devices 110, 120, 155 may establish a connection to the communications network 145 via a wireless connection or with a wired connection. Accordingly, for example, the computing device 110 may establish a connection with the computing device 120 and vice versa. The computing devices 110, 120, 155 may establish a connection with the service server 145 to utilize the features provided herewith in the exemplary embodiments. As will be described in further detail below, the computing devices 110, 120, 155 may be used by a participating entity in performing the first and second processes of the exemplary embodiments. Accordingly, for the second process, one of the parties may be a seller of a commodity and another one of the parties may be a buyer of the commodity. When not involved in the transactions, the computing devices 110, 120, 155 are still utilized by participating entities of the system but are non-parties to the transaction. As will be described in examples below, the computing devices 110, 120, may be used by the participating entities 105, 115, respectively, who are parties to transactions, while the computing device 155 may be used by the participating entity 150 who is a non-party to the transactions. In this manner, the participating entity 150 may be a "bystander" to the transactions. However, as will be described in further detail below, the participating entity 150 may still be included in an operation that results from the transactions being performed between the participating entities 105, 115.

The computing devices 110, 120, 155 may represent any electronic device that is configured to perform the functionalities described herein. For example, the computing devices 110, 120, 155 may be a portable device such as a tablet, a smartphone, a laptop, etc. In another example, the computing devices 110, 120, 155 may be a client stationary device such as a desktop terminal. The computing devices 110, 120, 155 may include the necessary software, hardware, and/or firmware required to perform the operations according to the exemplary embodiments. For example, the computing devices 110, 120, 155 may each include a processor, a memory arrangement, an input receiving device (e.g., a keyboard and a mouse), a transceiver (e.g., to establish the connection with the communications network 125), etc.

With regard to the participating entities, it is noted that the system 100 may include any number of participating entities. For example, the participating entities 105, 115 are participating entities of the system and parties to the transaction. Therefore, the participating entity 150 may be a participating entity only to the system (e.g., a non-party). However, the participating entity 150 may represent any number of participating entities who are non-parties. As those skilled in the art will understand, the system 100 utilizing the blockchain technology with a distributed ledger along with a consensus operation becomes effective with the inclusion of a plurality of participating entities. It is preferable to have a large number of participating entities such that a decision rendered via the consensus operation may be trusted. Accordingly, the participating entity 150 may represent a set of participating entities or bystanders to the transaction between the participating entities 105, 115. Furthermore, it is noted that the transaction including only one buyer and one seller is only exemplary. The exemplary embodiments may also perform transactions in which there may be one or more buyers and/or one or more sellers such as with bilateral and multilateral transactions. Accordingly, the participating entity 105 may represent a set of buyers (i.e., one or more buyers) and the participating entity 115 may represent a set of sellers (i.e., one or more sellers).

The communications network 145 may represent any single or plurality of networks used by the computing devices 110, 120, 155 to communicate with each other, the clearing house 130, the vault 135, and the service server 145. For example, if the computing device 110 is an enterprise computer associated with the participating entity 105, the communications network 125 may include an enterprise network in which the computing device 110 may initially connect. The enterprise network may connect to a network of an Internet service provider to connect to the Internet. Subsequently, through the Internet, a connection may be established with the other components of the system 100. It should be noted that the communications network 125 and all networks that may be included therein may be any type of network. For example, the communications network 125 may comprise a local area network (LAN), a wide area network (WAN), a virtual LAN (VLAN), a WiFi network, a HotSpot, a cellular network (e.g., 3G, 4G, Long Term Evolution (LTE), etc.), a cloud network, a wired form of these networks, a wireless form of these networks, a combined wired/wireless form of these networks, etc. The communications network 125 may also represent one or more networks that are configured to connect to one another to enable the data to be exchanged among the components of the system 100.

The clearing house 130 may be another type of financial institution that provides clearing and settlement services. That is, the clearing house 130 may be any clearing member. For example, the clearing house 130 may represent a clearing entity that is used when gold is exchanged in transactions. In another example, the clearing house 130 may represent a clearing entity that is used when treasury bonds, commodities derivatives, securities transactions, etc. are exchanged in transactions. Thus, the clearing service provided by the clearing house 130 may entail a clearing of payments to transform a promise of payment into an actual physical transfer of funds from one bank to another. Those skilled in the art will appreciate the necessity of clearing as a transaction may be performed in a timeframe less than that needed for completing the underlying transaction. Thus, the clearing service provided by the clearing house 130 may include the management of pre-settlement credit exposures to ensure that a transaction is settled according to market rules (e.g., even if a party should become insolvent prior to settlement). The clearing service performed by the clearing house 130 may include operations such as reporting/monitoring, risk margining, netting of trades to single positions, tax handling, and failure handling.

In performing its functionality, the clearing house 130 may be an intermediary entity standing between the participating entities 105, 115. When the participating entities 105, 115 are involved in a transaction, the participating entities 105, 115 may be referred to as clearing firms. In creating the transaction and the commitments to one another, the participating entity 105 may offer to purchase a commodity owned by the participating entity 115 (or the participating entity 115 may offer to sell the commodity to the participating entity 105). It may be assumed that the transaction is negotiated or agreed upon by the participating entities 105, 115 prior to the features of the exemplary embodiments being utilized. For example, the participating entities 105, 115 may communicate manually with one another in creating the transaction. In another example, the service entity 140 may provide a further service in which the service server 145 may enable the participating entities 105, 115 to communicate with one another to create the transaction (e.g., a direct line of communication may be established via the service server, a general advertisement may be placed for a purchase or sell opportunity for another participant to respond, etc.).

While providing the above described services, the clearing house 130 has an objective of reducing a risk of the participating entities 105, 115 involved in a transaction failing to honor the obligations of the transaction. The clearing house 130 may reduce the settlement risks through netting operations in which transactions are offset between multiple counterparties, providing independent valuation of trades and collateral, requiring collateral deposits, monitoring credit qualifications of the participating entities 105, 115, and in many cases, providing a guarantee fund that used to cover any losses exceeding a defaulting clearing firm's collateral on the deposit, etc. When a transaction and its terms have been agreed upon between the participating entities 105, 115, the transaction may be handed over to the clearing house 130. The clearing house 130 constructively steps between the participating entities 105, 115 and assumes a legal counterparty risk for the transaction. That is, the clearing house 130 performs a novation in which the trade title is transferred to the clearing house 130.

In view of the above manner in which the clearing house 130 operates where the clearing house 130 assumes and focuses the risk of settlement failures, the clearing house 130 may also isolate the effects of a failure of the participating entities 105, 115 (if any). The absorption of the risk through novation also introduces a need for the clearing house 130 to be properly managed and well-capitalized to ensure survival in the event of a significant adverse event (e.g., a large clearing firm defaulting, a market crash, etc.). As will be described in further detail below, the clearing house 130 being well-capitalized may be relevant during a fractionalization operation.

It should be noted that the use of a single clearing house 130 is only exemplary. The clearing house 130 may represent a set of one or more clearing institutions who cooperate in the clearing operation described above. Thus, the clearing house 130 may include a plurality of clearing houses that perform at least one portion of the clearing operation for the transaction to be completed. For example, the participating entity 105 may be associated with a first clearing house, while the participating entity 115 may be associated with a second, different clearing house. In another example, a further clearing house unassociated with either participating entities 105, 115 may be requested to become involved in the clearing operation.

The vault 135 may represent a storage location for a commodity. For example, the vault 135 may be managed by a custodian. The custodian may be a specialized type of bank tasked with safeguarding financial assets of the participating entities 105, 115. For example, the custodian may store assets or securities owned by the participating entities (e.g., stocks, bonds, commodities, currency, etc.). In further example, the custodian may perform other financial tasks such as settlement arrangement, information collection and tax related administration, administration of corporate actions, information gathering on the securities, foreign exchange transactions, etc. However, in contrast to the clearing house 130, there is no novation involved with the vault 135 and performs a role substantially similar to an escrow account/agent for the transaction. Accordingly, the vault 135 may represent any entity or physical location/component in which the commodity is physically moved to change ownership. For example, the clearing house 130 may house its commodities in the vault 135. In another example and as will be described in further detail below, the service entity 140 may also house its commodities in the vault 135.

It is noted that the service entity 140 may personally have commodities stored in the vault 135 or may cooperate with a depository partner in using the vault 135. Accordingly, the exemplary embodiments are described herein where the usage of the vault 135 by the service entity 140 may be a personal use, a partnered use, a shared used, etc. It is also noted that the use of a single vault 135 is only exemplary. For example, the clearing house 130 may interact with a plurality of different vaults. Thus, in a substantially similar manner as the vault 135, the service entity 140 may also hold a position in these vaults. Specifically, the service entity 140 may have a personal use, a partnered use, a shared use, etc. That is, the service entity 140 may have a presence where a commodity is being held by a clearing house 130 on behalf of ownership by the participating entities 105, 115, 150 who are participants to the distributed ledger system.

Figure 2:
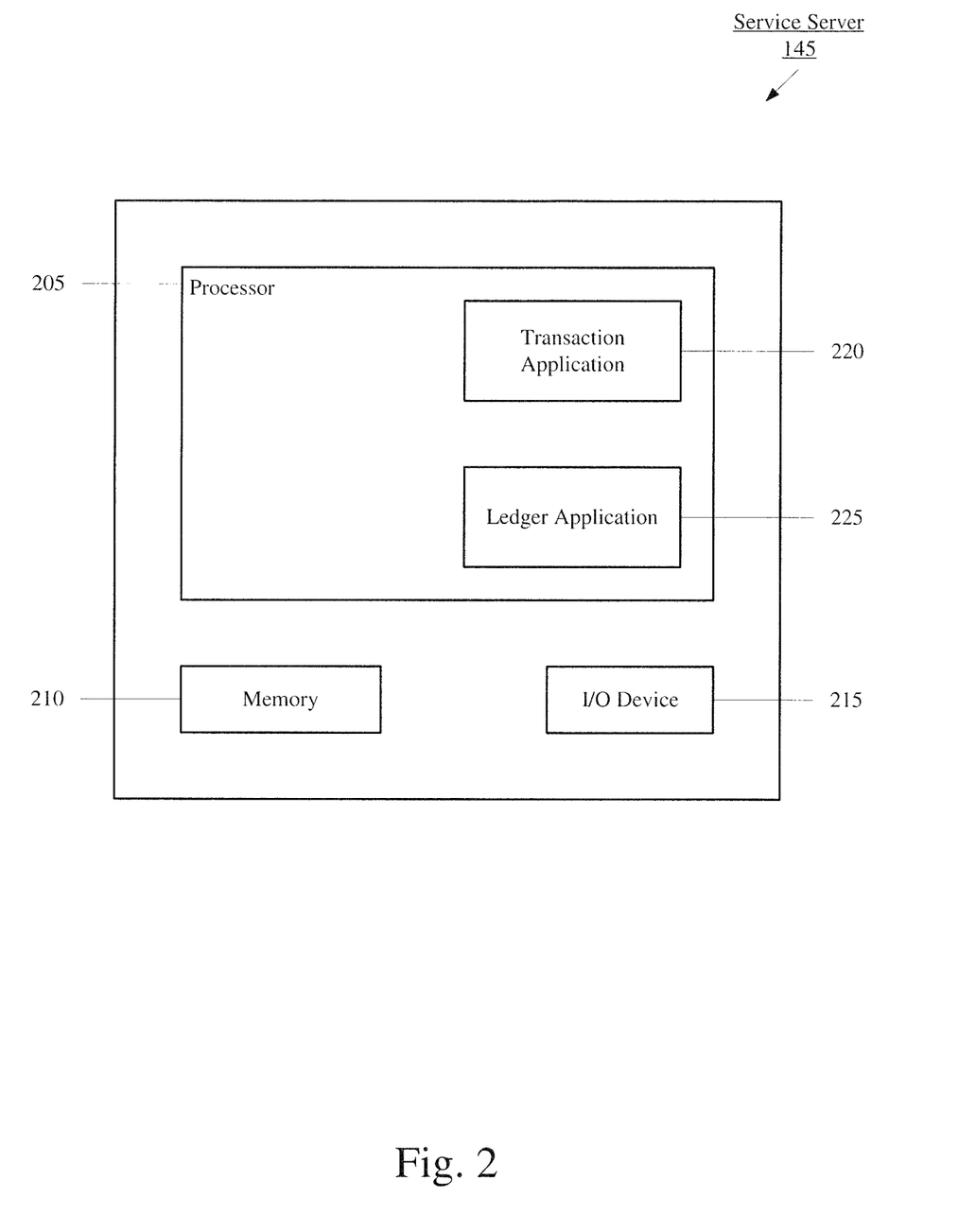
FIG. 2 shows a service server of the system of FIG. 1 according to the exemplary embodiments.

The service server 145 may be a component of the service entity 140 that provides the services according to the exemplary embodiments. The service entity 140 may represent any chartered trust organization or company. FIG. 2 shows the service server 145 of the system 100 of FIG. 1 according to the exemplary embodiments. The exemplary service server 145 includes a processor 205, a memory 210, and an input/output (I/O) device 215. As would be understood by those skilled in the art, the processor 205 performs conventional functionalities such as, for example, data processing functionalities via a transaction application 220 and a ledger application 225. The memory 210 performs data storage functionalities (e.g., storing data associated with the processes performed by the processor 205) and the I/O device 215 represents any input/output component that performs functionalities associated therewith (e.g., a transceiver). For example, the I/O device 215 may be used for data exchange functionalities. The I/O device 215 is illustrated in the system 100 of FIG. 1 as capable of wired communications but may also be configured to be capable of wireless communications.

With regard to the processing functionalities of the service server 145 indicated above, the processor 205 may be configured to execute the transaction application 220. The transaction application 220 may be used for operations associated with the first and second processes of the exemplary embodiments. The transaction application 220 may provide a first service in which a transaction between an owner of a commodity (e.g., the participating entity 115) and the service entity 140 is performed. Specifically, the first service may relate to the participating entity 115 exchanging the commodity for tokens from the service entity 140. The transaction application 220 may provide a second service for a transaction between a buyer of a commodity (e.g., the participating entity 105) and a seller of the commodity (e.g., the participating entity 115). Specifically, the second service may relate to the buyer remitting funds in exchange for the tokens of the seller, the tokens representing ownership of the commodity.

The processor 205 may also be configured to execute the ledger application 225. The ledger application 225 may operate in conjunction with the transaction application 220. Specifically, the ledger application 225 may generate a block to be added to a chain of blocks as used in the distributed ledger system of the service entity 140. As the block contains an indication of new or updated ownership of tokens, the ledger application 225 may be utilized for the first and second services of the transaction application 220. For example, when new tokens are generated for an owner of the commodity (e.g., the participating entity 115), the ledger application 225 may generate a block which includes information of the new tokens and their ownership to the owner. In another example, when tokens are exchanged for funds, the ledger application 225 may generate a block including information that a token has changed ownership (e.g., from the participating entity 115 to the participating entity 105 after a gold transaction has completed). With the ledger application 225 generating the blocks, the ledger application 225 may provide further features such as an encryption functionality (to encrypt the blocks to participating entities who are not involved in the transaction—non-parties) and a verification functionality (to determine whether a consensus has verified the transaction as valid so that the block may be generated).

According to the exemplary embodiments, the first service provided by the service entity 140 via the service server 145 may relate to a tokenization operation in which tokens are generated. Thus, the tokens may be traded by the owner of the commodity that is being held by the service entity 140. It is noted that the service entity 140 may receive physical possession of the commodity, but the service entity 140 does not own the commodity per se. That is, the commodity that is being held by the service entity 140 is still under the possession of the owner. Thus, tokens are not necessarily exchanged for the commodity but instead are issued in view of physical possession of the commodity by the service entity 140. The owner of the token still owns the commodity until the token is redeemed for re-possession of the commodity. The tokenization operation may relate to operations performed by a variety of the components of the system 100. Specifically, the tokenization operation may include operations performed by the owner of the commodity, the clearing house 130, the vault 135, and the service entity 140. A further operation that is performed by the service entity 140 may affect the remaining participants of the distributed ledger system via an updating of the distributed ledger. The tokenization operation will be described from various perspectives of the components in the system 100.

Initially, the participating entity 115 may own a commodity. The ownership of the commodity may be with respect to a variety of different ownership types. In a first example, the participating entity 115 may have physical possession of the commodity (e.g., in the vault 135). That is, the participating entity 115 may have identification information specifying which bars of gold held in the vault 135 belong to the participating entity 115. In a second example, the participating entity 115 may have an ownership position of the commodity. Specifically, the participating entity 115 may own the commodity but has no specificity as to an actual physical commodity. That is, the participating entity 115 may have an amount of the commodity that may be guaranteed to be available for use by the participating entity 115. It is noted that the availability of the commodity may be guaranteed by a variety of different types of entities (e.g., custodian bank). In this manner, the participating entity 115 may have an unallocated position of the commodity as the ownership does not correspond directly to an actual physical possession by the participating entity 115. For illustrative purposes, the description herein relates to when the participating entity 115 has an unallocated position of ownership of the commodity whereas the clearing house 130 has a physical possession of the commodity. It is noted that the unallocated position of the commodity of the participating entity 115 does not necessarily correlate to the commodity in the physical possession of the clearing house 130.

An initial operation may be performed by the participating entity 115. Specifically, the participating entity 115 may transmit a request to the service entity 140 via the service server 145. As is used herein, it may be assumed that any exchange of data between the participating entity 115 and the service entity 140 is performed using the network, hardware, and software components of the system 100 as described above. The request from the participating entity 115 may be a request for tokens. As described above, the tokens may be a digital representation for an ownership position. Thus, the tokens may not have a predetermined, finite amount of the commodity associated therewith. The request from the participating entity 115 may include a predetermined amount of the unallocated position for the commodity. For example, the participating entity 115 may have an unallocated position for 100,000 oz of gold. The request may indicate that 1,100 oz of the gold are to be represented with the tokens.

It is noted that the request may include other types of information. For example, the request may indicate the parties involved in the transfer of the unallocated position of the commodity. According to the exemplary embodiments, the unallocated position of the commodity owned by the participating entity 115 may be transferred to the service entity 140 that issues the tokens. The request may also indicate other information such as a backer of the unallocated position. Thus, the clearing house 130 may perform appropriate operations for the unallocated position to be properly transferred (e.g., due to the novation, a physical transfer from the clearing house 130 to the service entity 140 may require a replacement from the backer).

The request may also be transmitted from the participating entity 115 to the clearing house 130 for the proper execution of the gold transaction. As described above, the clearing house 130 may act as an intermediary position for the gold transaction. The clearing house 130 may verify whether the request for the gold transaction is valid through receiving requests for the gold transaction from all involved parties. In the present example, the clearing house 130 may wait until a respective request is received from the participating entity 115 and the service entity 140 to verify the gold transaction. It is noted that the clearing house 130 may require further information and/or operations to verify the gold transaction. However, for illustrative purposes, the clearing house 130 receiving the requests from the involved parties may represent all operations and requirements necessary for verification purposes.

Once the clearing house 130 has verified the gold transaction between the participating entity 115 and the service entity 140, the clearing house 130 may perform further operations associated with the transfer involved in the gold transaction. As described above, the request from the participating entities 115 and the request from the service entity 140 may each indicate the unallocated position of the commodity that is to be transferred from the participating entity 115 to the service entity 140. Through the novation, the clearing house 130 may instruct the vault 135 to perform a transfer of a physical quantity of the commodity. As noted above, the clearing house 130 may be well-capitalized. In the particular instance, the clearing house 130 may have sufficient gold bars for requested gold transactions to be completed.

The clearing house 130 may instruct the vault 135 to physically transfer enough gold bars to cover the unallocated position to be transferred from the participating entity 115 to the service entity 140. As described above, it is again noted that the participating entity 115 still remains the owner of the commodity (although possession is under the service entity 140). In the above example, the participating entity 115 may request that 1,100 oz of an unallocated position of gold is to be transferred. Depending on geographic location and/or geographic requirements, the gold bar may have a respective size. For example, a good delivery gold bar in New York is standardized to 100 oz each, in Asia is standardized to 1 kg each, and in London is standardized to 400 oz each. For illustrative purposes, the London standard may be assumed to be used. Thus, the request of 1,100 oz of gold may be covered by three bars of gold that totals 1,200 oz of gold. That is, to move 1,100 oz of gold, a total amount of gold bars that is rounded up to the next nearest amount of gold bars is physically transferred. Those skilled in the art will appreciate that delivery of gold bars is performed as units of gold bars having the weight as indicated above. Accordingly, three gold bars totaling 1,200 oz are to be physically transferred to cover 1,100 oz of gold. The clearing house 130 may instruct that three bars be selected from the vault 135 and moved to the possession of the service entity 140 (e.g., a vault of the service entity 140, to a depository partner in the vault 135, etc.). Since the service entity 140 has a presence in the vault 135, the transfer may be performed within a reasonable amount of time (e.g., within a day, within a settlement window, etc.).

It is noted that although the ownership of the participating entity 115 is an unallocated position, since actual gold bars have been moved into the possession of the service entity 140 from the clearing house 130, the possession by the service entity 140 may be for an allocated commodity, namely the three bars that were physically transferred. In this manner, identification information of the three bars may be associated with an allocated position of the 1,200 oz of gold.

It is also noted that the clearing house 130 may perform the verification operation at various times. For example, the clearing house 130 may verify the gold transaction upon receiving all required information (e.g., the requests from the involved parties). In another example, the clearing house 130 may provide a window in which all required information may be submitted thereto from all involved parties (e.g., a settlement window, by the end of the day, etc.).

When the commodity has been physically transferred to the service entity 140, the clearing house 130 may transmit a response for the request to the parties involved in the gold transaction. Thus, the participating entity 115 and the service entity 140 may receive an indication that the unallocated position of the participating entity 115 has been transferred to the service entity 140. The indication to the service entity 140 may also include further information such as identification information of the specific gold bars that are now in possession of the service entity 140.

When the service entity 140 has received the response from the clearing house 130, the service entity 140 may perform operations associated with the tokenization. Specifically, the service entity 140 may generate the tokens to be associated with the participating entity 115. It is again noted that for illustrative purposes, the tokens generated by the service entity 140 may be a representation of the commodity and not necessarily a fixed ratio indicative of a finite amount of the commodity linked to each token.

Initially, the service entity 140 may determine a total value as indicated in the response from the clearing house 130 resulting from the physical transfer of the commodity from a physical possession of the clearing house 130 to a physical possession of the service entity 140. As described above, the clearing house 130 may have instructed that three gold bars totaling 1,200 oz be physically transferred to the service entity 140. Using the total value of the physical transfer, the service entity 140 may determine how the tokens are to be generated. Specifically, as the total value is at least the requested amount indicated from the participating entity 115, the total value may potentially be over the requested amount.

In the current example, as the total value exceeds the requested amount, the service entity 140 may generate first tokens to be assigned to the participating entity 115. Specifically, the first tokens may represent a value corresponding to the requested amount of the unallocated position of the commodity (i.e., 1,100 oz). The service entity 140 may also generate second tokens to be assigned to the owner of the remainder (i.e., 100 oz). In an exemplary embodiment, the owner of the remainder may be the clearing house 130 as the gold bars under the possession of the clearing house 130 was physically transferred to the service entity 140. However, it should be noted that the clearing house 130 being assigned the second tokens is only exemplary and any entity that ultimately has ownership to the remainder may be assigned the second tokens. In this manner, the service entity 140 may generate the first tokens representing the requested amount that is assigned to the participating entity 115 and the second tokens representing the remainder amount that is assigned to the clearing house 130.

With the generation of these new tokens, the information corresponding to the generation and ownership of these tokens is propagated to the participating entities of the distributed ledger system. In a first example, the information may be transmitted to the participating entities involved in the gold transaction. In this case, the participating entity 115 may be provided data corresponding to this information as to its ownership of the newly generated tokens. In a second example, the information may also be transmitted to the participating entities of the system 100. Specifically, the block may be generated for addition to the blockchain of the distributed ledger. However, for security purposes, the data of this information that is embodied in the block may be encrypted. It is noted that any encryption scheme may be used in generating the block. Once the block has been generated for the distributed ledger, the service entity 140 may transmit the block to the participants to update the information of all tokens and ownership thereof that is used in the system 100. Specifically, the block may be transmitted to the participating entities 105, 115, 150.

As described above, the three gold bars totaling 1,200 oz were physically transferred from the clearing house 130 to the service entity 140. Therefore, the first and second tokens that are generated for assignment to the participating entity 115 and the clearing house 130 may be allocated to these three gold bars. For example, the first tokens may include a first portion representing 800 oz of the 1,100 oz that is allocated to a first one and a second one of the three gold bars. The first tokens may include a second portion representing the remaining 300 oz of the 1,100 oz that is allocated to the third one of the three gold bars. The second tokens may represent the remainder amount of 100 oz from the total 1,200 oz that is allocated to the third one of the three gold bars. Thus, the information included in the block regarding the generation and ownership may also reference the specific bar to which the physical commodity is allocated being held by the service entity 140 in the vault 135.

It is noted that the verification of the gold transaction involved in the tokenization operation may also utilize the consensus operation. Specifically, the consensus operation may still take place as all the participants are ultimately made aware of the creation of the token.

According to the exemplary embodiments, the second service provided by the service entity 140 via the service server 145 may relate to a transaction operation between the participating entities 105, 115 in which tokens are exchanged for funds. Thus, the tokens that represent the commodity may be used in lieu of a physical transfer of the commodity from the participating entity 115 to the participating entity 105. Accordingly, the ownership of the commodity is exchanged. In this manner, the time frame for a gold transaction between the participating entities 105, 115 may be completed in a more efficient way. For example, a gold transaction using a traditional exchange may require four days to complete from the transaction being negotiated or agreed upon by the participating entities 105, 115. However, the gold transaction using the mechanism according to the exemplary embodiments may be completed within a day or within the same day from the transaction being negotiated or agreed upon by the participating entities 105, 115. The transaction operation may relate to operations performed by a variety of the components of the system 100. Specifically, the transaction operation may include operations performed by the buyer of the commodity (e.g., the participating entity 105), the seller of the commodity (e.g., the participating entity 115), the clearing house 130, the vault 135, and the service entity 140. A further operation that is performed by the service entity 140 may affect the remaining participants of the distributed ledger system via an updating of the distributed ledger (e.g., the participating entity 150). The transaction operation will be described from various perspectives of the components in the system 100.

The transaction described herein may assume that the participating entity 115 that is selling the commodity has already tokenized the commodity (e.g., using the first process described above). Thus, the transaction relates to an exchange of funds for tokens. However, it should be noted that the second service may incorporate the first service. Specifically, the first service may be inserted into the operations of the second service for the tokens to become available for a commodity that is purchased. For example, the participating entity 115 may not have enough tokens available but wishes to perform the transaction using tokens. Thus, aspects of the second service may have already been performed to trigger the first service to be used therein for the remainder of the second service to be completed.

The participating entities 105, 115 may enter into a negotiated agreement to exchange a commodity for funds. Specifically, the agreement is an exchange for tokens representing the commodity for funds. As described above, the agreement may be entered into by the participating entities 105, 115 using a variety of different methods (e.g., personally contacting one another for a purchase offer or sell offer, an advertisement, etc.). After the participating entities 105, 115 have negotiated the terms (e.g., an amount of funds and an amount of the commodity, a rate of exchange, etc.), the agreement may be executed to perform the transaction.

Initially, when used for the transaction operation, the transaction application 225 of the service server 145 may operate with a modified infrastructure from conventional infrastructures by leveraging the distributed ledger system. From a network architecture perspective, the service server 145 may operate with two layers: a messaging layer and a consensus layer. As will be described in further detail below, the messaging layer may be directed to clearing and matching transactions, verifying funds, messaging, and netting whereas the consensus layer may be directed to performing a consensus operation and adding blocks to blockchains to update the distributed ledger.

When the agreement has been entered by the participating entities 105, 115, the participating entities 105, 115 may communicate the request associated with the agreement over the messaging layer for matching to be dropped into the consensus layer for validation and permanently entered into the distributed ledger. Thus, the requests from each of the participating entities 105, 115 may be received by the service server 145 which is used herein as a representation of the service (and the messaging layer). Through the consensus operation, verified transactions may be further processed. It is noted that the consensus operation may be performed at a variety of different times. For example, the consensus operation may be performed by being triggered from a transaction being attempted to be completed. In another example, the consensus operation may be performed at predetermined intervals (e.g., every 30 seconds).

Thus, a request from the participating entity 105 may include details of the transaction including an identity of the participating entity 115 that has the tokens and the terms of the agreement. A request from the participating entity 110 may also include corresponding details of the transaction including an identity of the participating entity 105 that has the funds and the terms of the agreement. When the requests have been matched and verified, further processing is performed. It is again noted that there may be additional parties to the transaction. Thus, the matching and/or netting process that is performed may require actions performed by each of the involved parties.

Once matched, the service entity 140 may determine an ownership position of the participating entity 115 of the tokens assigned thereto. Specifically, the consensus operation may verify whether the tokens purported to be available for the agreement are in fact available. It is again noted that the consensus operation may ensure that a double spending issue does not arise.

When the tokens of the participating entity 115 have been verified, the service entity 140 may perform the further operations. Initially, the distributed ledger may be constructively or actually prevented from being updated. This prevention operation may be associated with the consensus operation. Thus, with the distributed ledger being prevented from being changed, the block associated with the current transaction may be generated. To complete the transaction, the participating entity 105 may be instructed to perform its terms by remitting the agreed upon funds. Those skilled in the art will understand the various and efficient manners in which funds may be remitted from the participating entity 105 to the participating entity 115. When the funds have been verified as being remitted (e.g., a confirmation is received from the receiving party, from the sending party, from both parties, etc.), the service entity 140 may enable updating of the distributed ledger and add the block corresponding to the transaction to the distributed ledger which is propagated to the participants of the distributed ledger system. The service entity 140 may also send data corresponding to the completed transaction to the involved parties.

It is again noted that the information of the block may be encrypted for security purposes. For example, the identities of the parties involved in the transaction may be prevented from being disclosed through encryption. In another example, the details of the transaction (e.g., funds transferred, representative commodity amount transferred, etc.) may also be prevented from being disclosed through the encryption.

Figure 3:
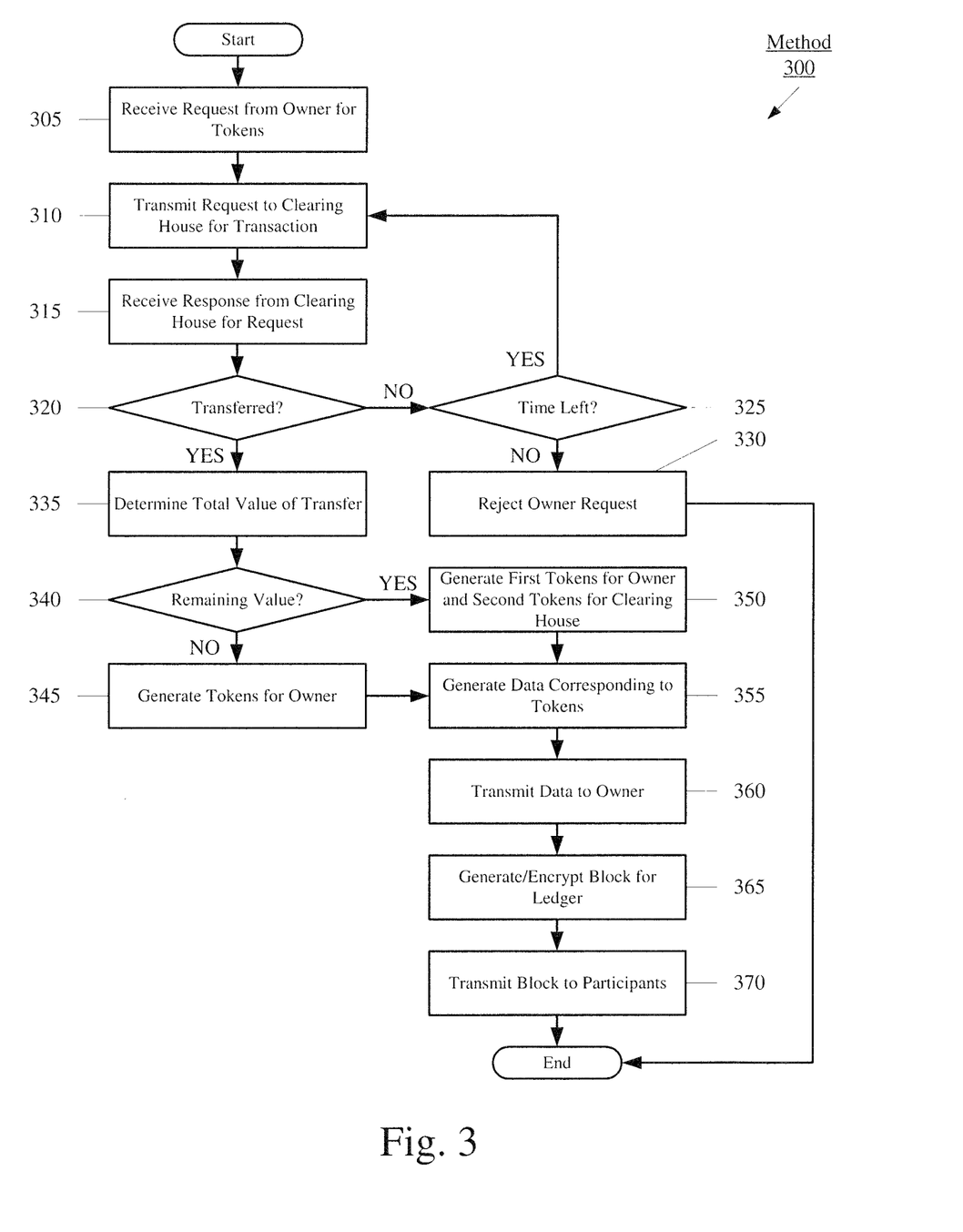
FIG. 3 shows a method of a first process for generating tokens according to the exemplary embodiments.

FIG. 3 shows a method 300 of the first process for generating tokens arrangement according to the exemplary embodiments. Specifically, the method 300 relates to the tokenization operation in which a commodity is represented by tokens as used in the service provided by the service entity 140. That is, a physical possession of the commodity may be moved under the control of the service entity 140 but the ownership remains with the participating entity who is the owner. The method 300 will be described from the perspective of the service entity 140. The method 300 will also be described with regard to the system 100 of FIG. 1 and the service server 145 of FIG. 2. It is again noted that communications in which data is exchanged is performed through the appropriate network, hardware, and/or software of the respective entities.

In step 305, the service entity 140 receives a request from the participating entity 115 for tokens. It may be assumed that a corresponding request was transmitted from the participating entity 115 to the clearing house 130. The request may include various types of information. Specifically, the request may include an identity of the participating entity 115, an identity of the service entity 140, and a predetermined amount of the commodity that is to be transferred in ownership. As noted above, the ownership by the participating entity 115 may be an unallocated position of the commodity that is housed by another entity (e.g., a custodian bank).

In step 310, the service entity 140 may transmit a request to the clearing house 130. As described above, in performing its functionality, the clearing house 130 may first determine whether a transaction is valid. Thus, one requirement may be that requests from the involved parties are received from the respective parties with details of the transaction. Accordingly, the service entity 140 may generate the request based upon the information included in the request received from the participating entity 115.

In step 315, the service entity 140 may receive a response from the clearing house 130. The response may be in relation to the request that was transmitted to the clearing house 130 from the service entity 140. As the request transmitted to the clearing house 130 from the service entity 140 includes details of the participating entity 115 and the service entity 140 along with a commodity amount to be transferred, the clearing house 130 may attempt to perform operations that satisfy a verified request.

In step 320, the service entity 140 determines whether the response indicates that the requested transfer of the commodity has been performed. That is, the service entity 140 determines whether the response indicates that the unallocated position of the participating entity 115 has resulted in a physical transfer of the commodity from the clearing house 130 to the service entity 140 within the vault 135 (resulting in an allocated commodity owned by the service entity 140). However, there may be instances where the clearing house 130 determines that the participating entity 115 does not have enough ownership of the commodity indicated in the request. When such a scenario arises, the response may indicate that the commodity was not transferred. Thus, in step 325, the service entity 140 may determine whether there is time remaining for the transaction to still be completed. For example, the participating entity 115 may have performed other transactions that lead to the participating entity 115 having a sufficient amount of the commodity but that these transactions have not yet completed. Thus, the service entity 140 may provide a window in which the physical transfer of the commodity to the service entity 140 may be performed. If there is still time left in the window, the service entity 140 may return the method 300 to step 310. However, if there is no time remaining, the service entity 140 may reject the request.

The window in which to determine whether the physical transfer has been performed may be based upon a variety of factors. In a first example, the window may be a value associated with the service entity 140. Specifically, the value may be a predetermined amount of time in which the request for tokenization may remain pending until an ultimate rejection must be issued. In a second example, the window may be a value associated with the clearing house 130. Specifically, the value may be a settlement window or other timer that the clearing house 130 uses in which the gold transaction may be completed. By aligning the window with the value of the clearing house 130, the service entity 140 may reject requests that have also been rejected by the clearing house 130.

It should be noted that the window and the rejection of the request may not incorporate the responsibilities of the clearing house 130 which has assumed these responsibilities through the novation. That is, there may also be scenarios such as insolvency of the participating entity 115 that may have occurred after the request was transmitted to the clearing house 130. However, the clearing house 130 may perform appropriate operations associated with handling these types of scenarios that protect the service entity 140.

Returning to step 320, if the service entity 140 has determined that the commodity has been physically transferred from the clearing house 130 to the service entity 140 in the vault 135, the service entity 140 continues the method 300 to step 335. As discussed above, the clearing house 130 may perform a variety of different operations upon verifying the request for the gold transfer. The indication from the clearing house 130 that these operations were completed allows the service entity 140 to perform subsequent operations.

In step 335, the service entity 140 determines a total value of the physical transfer of the commodity. As described above, the physical transfer of the commodity from the clearing house 130 to the service entity 140 in the vault 135 entails units of the commodity to be physically transferred. However, the units that are physically transferred must cover the requested amount indicated in the request received from the participating entity 115. For example, the requested amount may be 1,600 oz of gold in which a gold bar is standardized as 400 oz each. Thus, four gold bars perfectly satisfy the 1,600 oz request as four gold bars has a total value of 1,600 oz. However, in another example, the requested amount may be 1,000 oz of gold in which a gold bar is standardized as 400 oz each. Thus, three gold bars satisfy the 1,000 oz request as three gold bars has a total value of 1,200 oz.

In step 340, the service entity 140 determines whether there is a remainder amount from the total amount after the requested amount has been processed. If there is no remainder amount, the service entity 140 continues the method 300 to step 345 to generate the tokens to be assigned to the participating entity 115. However, if there is a remainder amount, the service entity 140 continues the method 300 to step 350 to generate first tokens to be assigned to the participating entity 115 (that correspond to the requested amount) and second tokens to be assigned to the clearing house 130 (that correspond to the remainder amount). It is again noted that the clearing house 130 being assigned the second tokens is only exemplary and any owner of the remainder amount may be assigned the second tokens.

In step 355, the service entity 140 generates data corresponding to the generation of the tokens and the ownership assignment of the tokens. For example, with no remainder amount, the data may include that the tokens were generated for the participating entity 115 only having a representative value corresponding to the requested amount. In another example, with a remainder amount, the data may include that the first tokens were generated for the participating entity 115 having a representative value corresponding to the requested amount and second tokens were generated for the clearing house 130 having a representative value corresponding to the remainder amount.

In step 360, the service entity 140 transmits the data to the parties involved in the gold transaction. Thus, the participating entity 115 and potentially the clearing house 130 may receive the data regarding their ownership of the tokens. In step 365, the service entity 140 generates and encrypts a block corresponding to the gold transaction to be added to the distributed ledger. Thus, in step 370, the service entity 140 transmits the block to the participating entities of the distributed ledger system.

Figure 4:
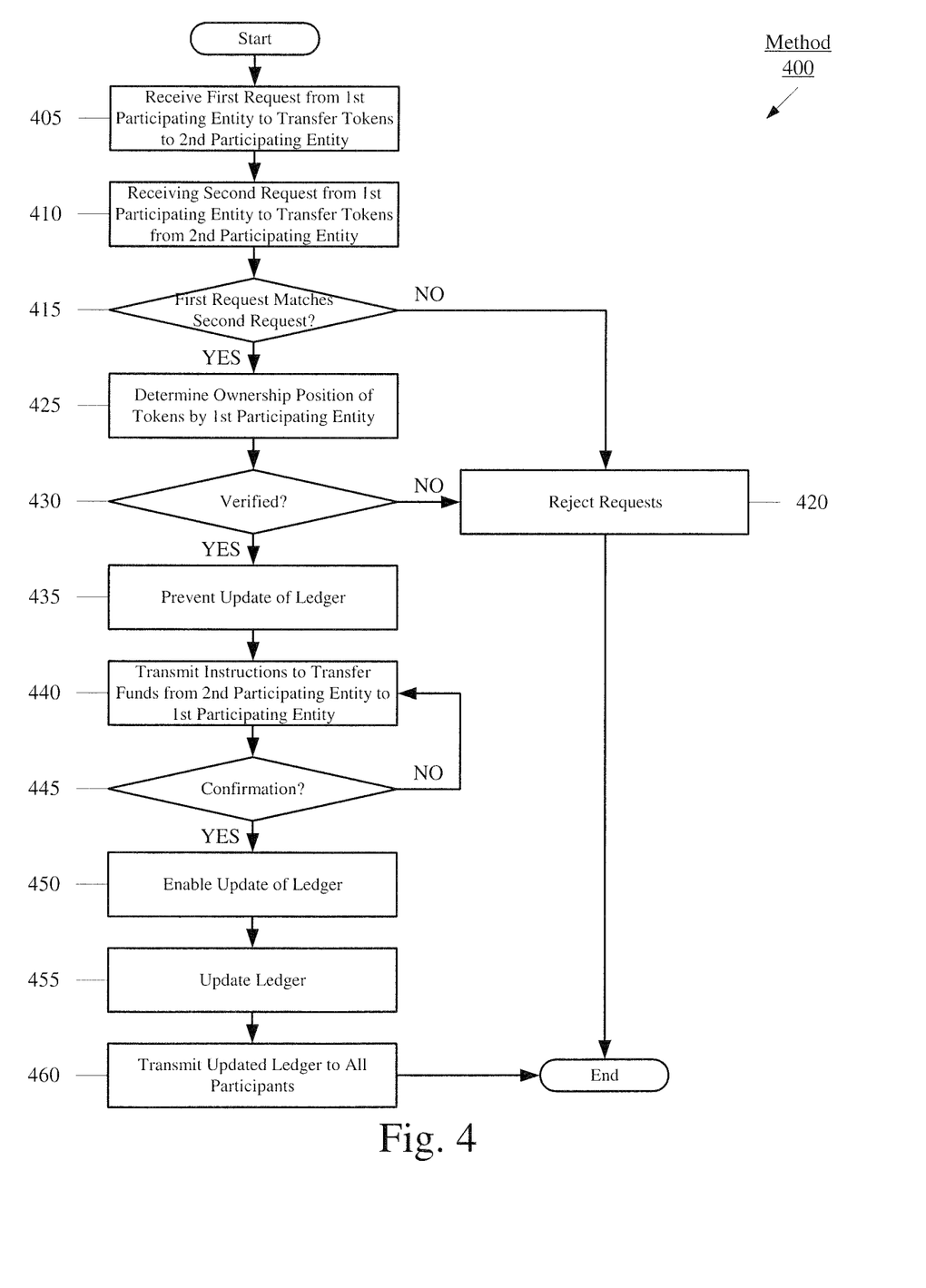
FIG. 4 shows a method of a second process for performing a transaction according to the exemplary embodiments.

FIG. 4 shows a method 400 of the second process for performing a transaction according to the exemplary embodiments. Specifically, the method 400 relates to the transaction operation in which funds are exchanged for tokens (i.e., ownership of the commodity) as used in the service provided by the service entity 140. The method 400 will be described from the perspective of the service entity 140. The method 400 will also be described with regard to the system 100 of FIG. 1 and the service server 145 of FIG. 2. It is again noted that communications in which data is exchanged is performed through the appropriate network, hardware, and/or software of the respective entities.

In step 405, the service entity 140 receives a first request from the participating entity 115 (representing the seller). In step 410, the service entity 140 receives a second request from the participating entity 105 (representing the buyer). The first request from the participating entity 115 and the second request from the participating entity 105 may indicate that the transaction is between these parties for a previously negotiated or agreed upon funds to token transfer. Thus, it may be assumed for the method 400 that the participating entities 105, 115 have negotiated the terms of the transaction prior to transmitting the respective requests. It is noted that the timing in which the first and second requests are received by the service entity 140 is irrelevant so long as the requests are received for matching/netting purposes. However, it should also be noted that there may be a time window associated with receiving the requests before the overall request is rejected.

It should again be noted that the second service of the transaction operation may incorporate the first service of the tokenization operation. For example, the participating entities 105, 115 may have agreed to use the tokens. Thus, the first and second requests may be transmitted to the service entity 140. However, the first and second requests may indicate an exchange of funds for an unallocated position of the commodity. In this manner, the first service described in the method 300 above may be incorporated to exchange the commodity to the tokens for use in the remainder of the method 400.

In step 415, the service entity 140 determines whether the first request matches the second request. As described above, the matching operation may validate whether all involved parties are genuinely involved in the transaction. The validation of the transaction through the matching operation may allow the transaction to proceed. However, if not validated, the service entity 140 continues the method 400 to step 420. In step 420, the service entity 140 rejects the requests.

If the first request matches the second request, the service entity 140 continues the method 400 to step 425. In step 425, the service entity 140 determines an ownership position of the tokens by the participating entity 115. Specifically, the consensus operation as used in the distributed ledger system with blockchain technology may be used in this verification operation. Specifically, the consensus operation may indicate whether the participating entity 115 has sufficient tokens to perform the requested transaction. Thus, in step 430, the service entity 140 determines whether the transaction is indeed verified via the consensus operation. If not verified, the service entity 140 continues the method 400 to step 420. However, if verified, the service entity continues the method 400 to step 435.

It should be noted that the ownership position of the participating entity 115 for tokens may also have a corresponding operation for the participating entity 105. For example, the participating entity 105 may be required to furnish proof that the funds that are agreed upon in the transaction are available. Thus, the service entity 140 may also verify whether the participating entity 105 is capable of performing its part in the transaction.

It should also be noted that step 420 may include further steps prior to a terminating action of rejecting the requests. For example, the obligated amount of the participating entity 115 may be determined to exceed an available sum of a balance or credit (e.g., of tokens). The participating entity 115 may also fail to borrow (e.g., from the market) to cover the shortfall. Thus, according to the method 400, the service entity 140 may reject the request. However, prior to the rejection, the service entity 140 may also utilize an exception pool. The exception pool may provide a buffer in which the transaction remains until the participating entity 115 remedies the situation. Transactions that are in the exception queue may automatically roll to an ensuing settlement window for a predetermined amount of time. For example, the rolling may occur until the end of a given day. If the participating entity 115 is unable to remedy the shortfall within the predetermined amount of time, the transaction may be rejected. While the transaction is in the exception pool, any funds promised to the participating entity 115 from the participating entity 105 may be held or prevented to protect the buyer.

Returning to the method 400 where the transaction is verified, in step 435, the service entity 140 completes the transaction. Specifically, the service entity 140 prevents an update of the distributed ledger. More particularly, the distributed ledger may be prevented from being updated with regard to the tokens involved in the current transaction. In step 440, the service entity 140 instructs the participating entity 105 to furnish the funds to the participating entity 115. In step 445, the service entity 140 confirms that the funds were remitted. If not remitted, the service entity 140 may transmit the instruction again for a predetermined amount of time. If the funds fail to be furnished by the participating entity 105 within the predetermined amount of time, the transaction may be rejected.

Once the funds are confirmed as being remitted from the participating entity 105 to the participating entity 115, the service entity 140 may generate data corresponding to the completion of the transaction and transmit the data to the involved parties. Thus, the participating entity 105 may receive an indication that the tokens are now under ownership thereby while the participating entity 115 may receive an indication that the tokens have been debited and the funds have been deposited.

Additionally, in step 450, the service entity 140 enables updating of the distributed ledger such that in step 455, a block is generated corresponding to the transaction so that the distributed ledger may be updated. In step 460, the service entity 140 transmits the block to all the participating entities of the distributed ledger system.

It is again noted that the tokens represent an ownership of the commodity that is under the physical possession of the service entity 140. Accordingly, the service entity 140 may provide a further service in which the physical possession is returned to the participating entity who owns the token. Specifically, a redeeming operation may be provided in which the token is redeemed for the commodity. In this manner, the owner of the commodity may utilize the owned commodity as desired.

The exemplary embodiments provide a device, system, and method to transfer commodities using a tokenized asset. The exemplary embodiments relate to a mechanism in which a commodity is represented by tokens. Accordingly, the tokens may be exchanged for funds between participating entities to expedite completion of a transaction in an efficient manner. In a first process of the exemplary embodiments, a tokenization operation may allow a participating entity to transfer an ownership or position of a commodity in exchange for tokens. In a second process of the exemplary embodiments, a transaction operation may allow participating entities to exchange the ownership of the tokens for funds.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a mobile device having an operating system such as iOS, Android, etc. In a further example, the exemplary embodiments of the above described method may be embodied as a program containing lines of code stored on a non-transitory computer readable storage medium that may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
   (A) receiving, by a first entity computer of a first entity, from a second entity computer of a second entity a request for tokens, the request indicating a predetermined amount of an unallocated position of a commodity of the second entity, the unallocated position being managed by a third entity computer of a third entity;
   (B) transmitting, by the first entity computer, to the third entity computer, a further request for a transfer of the unallocated position of the second entity to the first entity;
   (C) receiving, by the first entity computer, from the third entity computer an indication of the transfer of the unallocated position from the second entity to the first entity;
   (D) generating, by at least in part the first entity computer and using a blockchain-based system in which a consensus operation operating on a plurality of distributed computer nodes updates a distributed ledger in which multiple copies of the distributed ledger exist across the plurality of distributed computer nodes, the tokens to be assigned to the second entity, the tokens corresponding to the predetermined amount of the unallocated position of the second entity indicated in the request and the tokens being added to a block in the blockchain-base system according to the consensus operation;
   (E) generating, by the first entity computer, data which comprises first data corresponding to the generating of the tokens and second data corresponding to an ownership of the tokens; and
   (F) transmitting, by the first entity computer, the data to the second entity computer.

2. The method of claim 1, wherein the step (E) further comprises:
   (i) encrypting, by the first entity computer, the data to yield encrypted data; and
   (ii) transmitting, by the first entity computer, the encrypted data to predetermined recipients.

3. The method of claim 2, wherein the predetermined recipients comprise the second entity and the third entity.

4. The method of claim 1, wherein the indication is further indicative of a physical transfer of the commodity from the third entity to the first entity.

5. The method of claim 4, wherein the physical transfer of the commodity corresponds to a first value and the predetermined amount of the unallocated position of the second entity corresponds to a second value, the first value being greater than the second value.

6. The method of claim 5, further comprising:
   generating, by the first entity computer, further tokens to be assigned to the third entity, the further tokens corresponding to a difference between the first value and the second value; and
   generating, by the first entity computer, further data which comprises third data corresponding to the generating of the further tokens and fourth data corresponding to a further ownership of the further tokens.

7. The method of claim 6, wherein the step (E) further comprises:
   (i) encrypting, by the first entity computer, the data and the further data to yield encrypted data and encrypted further data; and
   (ii) transmitting, by the first entity computer, the encrypted data and the encrypted further data to predetermined recipients.

8. The method of claim 1, wherein the first entity is a chartered trust company, wherein the second entity is a commodity dealer, and wherein the third entity is a clearing member.

9. The method of claim 1, wherein the further request instructs the third entity to allocate the commodity from the third entity to the first entity, the unallocated position of the second entity corresponding at least partially to the allocated commodity.

10. The method of claim 1, wherein the commodity is gold.

11. A device associated with a first entity, comprising:
    a non-transitory memory having a program stored thereon; and
    a processor executing the program, wherein an execution of the program causes the processor to perform operations comprising:
    (A) receiving from a second entity computer of a second entity a request for tokens, the request indicating a predetermined amount of an unallocated position of a commodity of the second entity, the unallocated position being managed by a third entity computer of a third entity;
    (B) transmitting to the third entity computer a further request for a transfer of the unallocated position of the second entity to the first entity;
    (C) receiving from the third entity computer an indication of the transfer of the unallocated position from the second entity to the first entity;
    (D) generating, using a blockchain-based system in which a consensus operation operating on a plurality of distributed computer nodes updates a distributed ledger in which multiple copies of the distributed ledger exist across the plurality of distributed computer nodes, the tokens to be assigned to the second entity, the tokens corresponding to the predetermined amount of the unallocated position of the second entity indicated in the request and the tokens being added to a block in the blockchain-based system according to the consensus operation;

(E) generating data which comprises first data corresponding to the generating of the tokens and second data corresponding to an ownership of the tokens; and (F) transmitting the data to the second entity computer.

12. The device of claim 11, wherein the step (E) further comprises:
   (i) encrypting the data to yield encrypted data; and
   (ii) transmitting the encrypted data to predetermined recipients.

13. The device of claim 12, wherein the predetermined recipients comprise the second entity and the third entity.

14. The device of claim 11, wherein the indication is further indicative of a physical transfer of the commodity from the third entity to the first entity.

15. The device of claim 14, wherein the physical transfer of the commodity corresponds to a first value and the predetermined amount of the unallocated position of the second entity corresponds to a second value, the first value being greater than the second value.

16. The device of claim 15, wherein the processor performs further operations comprising:
   generating further tokens to be assigned to the third entity, the further tokens corresponding to a difference between the first value and the second value; and
   generating further data which includes third data corresponding to the generation of the further tokens and fourth data corresponding to a further ownership of the further tokens.

17. The device of claim 16, wherein the step (E) further comprises:
   (i) encrypting the data and the further data to yield encrypted data and encrypted further data; and
   (ii) transmitting the encrypted data and the encrypted further data to predetermined recipients.

18. The device of claim 11, wherein the first entity is a chartered trust company, wherein the second entity is a commodity dealer, and wherein the third entity is a clearing member.

19. The device of claim 11, wherein the further request instructs the third entity to allocate the commodity from the third entity to the first entity, the unallocated position of the second entity corresponding at least partially to the allocated commodity.

20. The device of claim 11, wherein the commodity is gold.

* * * * *